United States Patent

Mortensen et al.

[11] Patent Number: 5,953,385
[45] Date of Patent: Sep. 14, 1999

[54] METHOD AND DEVICE FOR DETECTING THE ERROR ON THE FREQUENCY OF A CARRIER

[75] Inventors: Ivar Mortensen, Korntal, Germany; Marie-Laure Boucheret, Goyrans, France; Henri Favaro, Ste Foy d'Aigrefeuille, France; Eric Belis, Toulouse, France

[73] Assignee: France Telecom, Paris, France

[21] Appl. No.: 08/934,932

[22] Filed: Sep. 22, 1997

[30] Foreign Application Priority Data

Sep. 23, 1996 [FR] France .................................. 96 11554

[51] Int. Cl.⁶ ............................................ H04L 7/00
[52] U.S. Cl. ........................ 375/354; 375/340; 375/325; 371/2.1; 371/47.1
[58] Field of Search .................. 375/354, 357, 375/360, 371, 373, 375, 376, 325, 326, 329, 340; 371/2.1, 37.9, 40.2, 47.1

[56] References Cited

U.S. PATENT DOCUMENTS

| | | | |
|---|---|---|---|
| 4,773,085 | 9/1988 | Cordell | 375/375 |
| 5,031,197 | 7/1991 | Hespelt et al. | 375/354 |
| 5,062,123 | 10/1991 | Geile et al. | 375/81 |
| 5,157,694 | 10/1992 | Iwasaki et al. | 375/329 |
| 5,157,698 | 10/1992 | Hespelt et al. | 375/354 |
| 5,373,247 | 12/1994 | Furukawa et al. | 329/306 |
| 5,619,167 | 4/1997 | Adachi | 329/304 |
| 5,727,027 | 3/1998 | Tsuda | 375/329 |

FOREIGN PATENT DOCUMENTS 0373405  6/1990  European Pat. Off. .

OTHER PUBLICATIONS

IEEE International Conference on Communications, Philadelphia, vol. 2, Jun. 12–15, 1988, Institute of Electrical and Electronics Engineers, pp. 1012–1016, XP000012468 Haeb R. et al. : "A Digital Synchronizer For Linearly Modulated Signals Transmitted Over A Frequency–Nonselective Fading Channel" * section V * * figure 4 *.

International Search Report dated Jun. 4, 1997, French Appl. FR 9611554.

*Primary Examiner*—Jason Chan
*Assistant Examiner*—Congvan Tran
*Attorney, Agent, or Firm*—Marshall, O'Toole, Gerstein, Murray & Borun

[57] ABSTRACT

In order to detect the error on the frequency of an M-PSK phase-modulated carrier, the phase $\psi(n)$ of the samples is restored to the interval $[-\pi, +\pi[$; $\phi(n)=\mathrm{mod}(\psi(n), 2\pi/M)$ is calculated; $d(n)=\mathrm{mod}(\phi(n)-\phi(n-1), 2\pi/M)$ is calculated; $p'(n)=\mathrm{mod}(d(n)+p(n-1), 2\pi/M)$ is calculated, where $p(n)=\mathrm{mod}(p^*(n), 2\pi/M)$, where $p^*(n)$ is obtained by subtracting the current output from $p'(n)$; $d'(n)=p'(n)-p(n-1)$ is calculated; a parameter "tri" is defined by tri=1 if $|d'(n)|<S$ and tri=$\beta$ if $|d'(n)|\geq S$, where S is a threshold; det_ tri(n)=$\alpha.p'$(n).tri is calculated, det_tri(n) constituting the current output, representative of the error on the frequency of the carrier.

5 Claims, 4 Drawing Sheets

METHOD AND DEVICE FOR DETECTING THE ERROR ON THE FREQUENCY OF A CARRIER

BACKGROUND OF THE INVENTION

The present invention relates to a method and to a device for detecting the error on the frequency of a carrier.

It finds an important application in systems for the coherent demodulation of phase-modulated signals, that is to say, in particular, signals referred to as PSK signals. For example, it can be used in a digital reception device of a radio link or an optical link.

Recovery of the carrier frequency is necessary for the coherent demodulation of signals which are transmitted by phase modulation of the carrier. In analogue reception devices, this recovery is generally carried out either using a frequency-locked loop or using a phase-locked loop.

There is currently an increasing trend towards digital signal processing. When the reception device is a digital device, there are a number of possibilities for recovering the carrier frequency. If the error on the carrier frequency is sufficiently small, the phase recovery circuit can be used for recovering the frequency as well. In a number of other cases, it is necessary to use a specific circuit for estimating and correcting the error on the carrier frequency.

In the prior art, distinction is drawn between two categories of methods for detecting the error on the carrier frequency, depending on whether these methods use looped structures or direct structures (that is to say in open loop).

In the case of direct structures, frequency estimators are generally used. They give an estimate of the frequency error. One drawback of direct structures is that they generally need to perform summations over a large number of samples, so that the variance of the frequency error is small. This entails a high degree of complexity in their implementation.

In the case of looped structures, a frequency error detector is generally used in a frequency-locked loop. In contrast to frequency estimators, frequency error detectors do not give an estimate of the error, but give a function of the error. In the prior art, distinction is drawn between two main types of detectors. A first type uses the principle of maximum likelihood and is based on the spectra of the signals. A second type uses a frequency estimator as the detector and is based on the time values of the difference between two samples.

Known frequency error detectors have the following drawbacks: those of the first aforementioned type lead to large variances in frequency error, which significantly degrade the performance of the phase recovery circuit. Detectors of the second aforementioned type have the following drawback: in order to give satisfactory results, they generally need to perform a prior summation over the differences between two samples, which entails a high degree of complexity in their implementation.

SUMMARY OF THE INVENTION

The object of the present invention is to overcome the drawbacks mentioned above. To achieve this object, the present invention proposes a method for detecting the error on the frequency of an M-PSK phase-modulated carrier, M being the number of phase states of the modulation, according to which, after clock recovery, sampling and digitizing of the in-phase and quadrature coordinates of the samples:

(a) the phase $\psi(n)$ of the samples is restored to the interval $[-\pi, +\pi[$;

(b) in order to eliminate the modulation, a series $\phi(n)=\mathrm{mod}(\psi n),2\pi/M)$ is calculated, where $\mathrm{mod}(x,2\pi/M)$ is obtained from x by subtracting from it or adding to it $2\pi/M$ until the value obtained lies on the interval $[-\pi/M, +\pi/M[$;

(c) a series $d(n)=\mathrm{mod}(\phi(n)-\phi(n-1),2\pi/M)$ is calculated;

(d) a series $p'(n)=\mathrm{mod}(d(n)+p(n-1), 2\pi/M)$ is calculated, where $p(n)=\mathrm{mod}(p^*(n), 2\pi/M)$, where $p^*(n)$ is a series obtained by subtracting the current output from $p'(n)$;

(e) a series $d'(n)=p'(n)-p(n-1)$ is calculated;

(f) a reliability parameter, referred to as "tri" is determined, which is defined by tri=1 if $|d'(n)|<S$ tri$\beta$if $|d'(n)|\geq S$ where $\beta$ is a real whose absolute value is less than 1, where S is a predetermined threshold and where $|.|$ denotes the absolute value;

(g) a series det_tri(n)=$\alpha$.p'(n).tri is calculated, where $\alpha$ is a real whose absolute value is less than 1, the series of values det_tri(n) constituting the current output, representative of the error on the frequency of the carrier.

In a particular embodiment, the threshold S is equal to $\pi/M$

If the modulation has $M=2^k$ states, k being a positive integer, eliminating the modulation in step (b) above consists in removing the k most significant or highest-rank bits of $\psi(n)$.

In a particular embodiment, the reals $\alpha$ and $\beta$ are powers of 2, with $\alpha$ positive and $\beta$ negative. By way of non-limiting example, for M=4 (phase modulation with 4 states), $\alpha=\frac{1}{4}$ and $\beta=-\frac{1}{2}$ may be chosen.

The present invention also proposes a device for detecting the error on the frequency of an M-PSK phase-modulated carrier, M being the number of phase states of the modulation, characterized in that it comprises a module for calculating a series of values representing the error on the carrier frequency.

In one embodiment, in which this device implements the above method, the module for calculating the series det_tri(n) comprises a computation module which receives, on a first input, the values of the series p'(n), which are quantized over a number NBI of bits, and, on a second input, the values of the series d'(n), which are quantized over a number NBI+1 of bits, and delivers as output the values of the series det_tri(n), and has:

a module for selecting the most significant bit (MSB), which module is connected to the aforementioned second input and delivers as output the MSB of d'(n);

a module for selecting the bit of significance immediately less than the MSB, which module is connected to the aforementioned second input and delivers as output the bit of d'(n) of significance immediately less than the MSB of d'(n);

an exclusive OR operator which receives, on one input, the MSB of d'(n), and on another input, the bit of d'(n) of significance immediately less than the MSB of d'(n), and performs an exclusive OR operation on these two input bits;

a module for multiplication by $\alpha$, which comprises a module for shifting to the right by $\alpha_1$ bits, where $\alpha_1=-\log_2\alpha$, is connected to the aforementioned first input and delivers as output the product (E1) of p'(n) by $\alpha$;

a module for multiplication by $\alpha.\beta$, which comprises a module for changing sign, which is connected to the said first input, and delivers as output the product of p'(n) by −1, and a module for shifting to the right by $\alpha_2$ bits, where $\alpha_2 = -\log_2(-\alpha.\beta)$, which is connected to the output of the module for changing sign and delivers as output the product of −p'(n) by (−$\alpha.\beta$), the module for multiplication by $\alpha.\beta$ delivering as output the product E2 of p'(n) by $\alpha.\beta$; and a switching module which has a first input, a second input and a control input, receives the product E1 on its first input, receives the product E2 on its second input, and receives the value of the output bit of the exclusive OR operator on its control input, this switching module delivering as output the values of the series det_tri(n), which are equal either to E1 or to E2, depending on the value of the output bit of the exclusive OR operator.

BRIEF DESCRIPTION OF THE DRAWINGS

The abovementioned characteristics, as well as others, will become more readily apparent on reading the following description of a particular embodiment, given by way of non-limiting example. The description refers to the accompanying drawings, in which.

DETAILED DESCRIPTION OF A PREFERRED EMBODIMENT

Throughout what follows, an M-PSK phase-modulated carrier will be considered. In the non-limiting application to a coherent demodulation system, the signal intended to be processed by the method and the device of the invention is obtained on the basis of the signal received as input by the receiver, after filtering, sampling and digitizing which are carried out by conventional procedures. These processing operations involve baseband conversion, generation of a complex digital signal, having in-phase and quadrature components, filtering using the adapted filter and clock-synchronization error correction. The signal obtained in this way, intended to be processed using the present method, comprises one complex sample per symbol.

Figure 1:
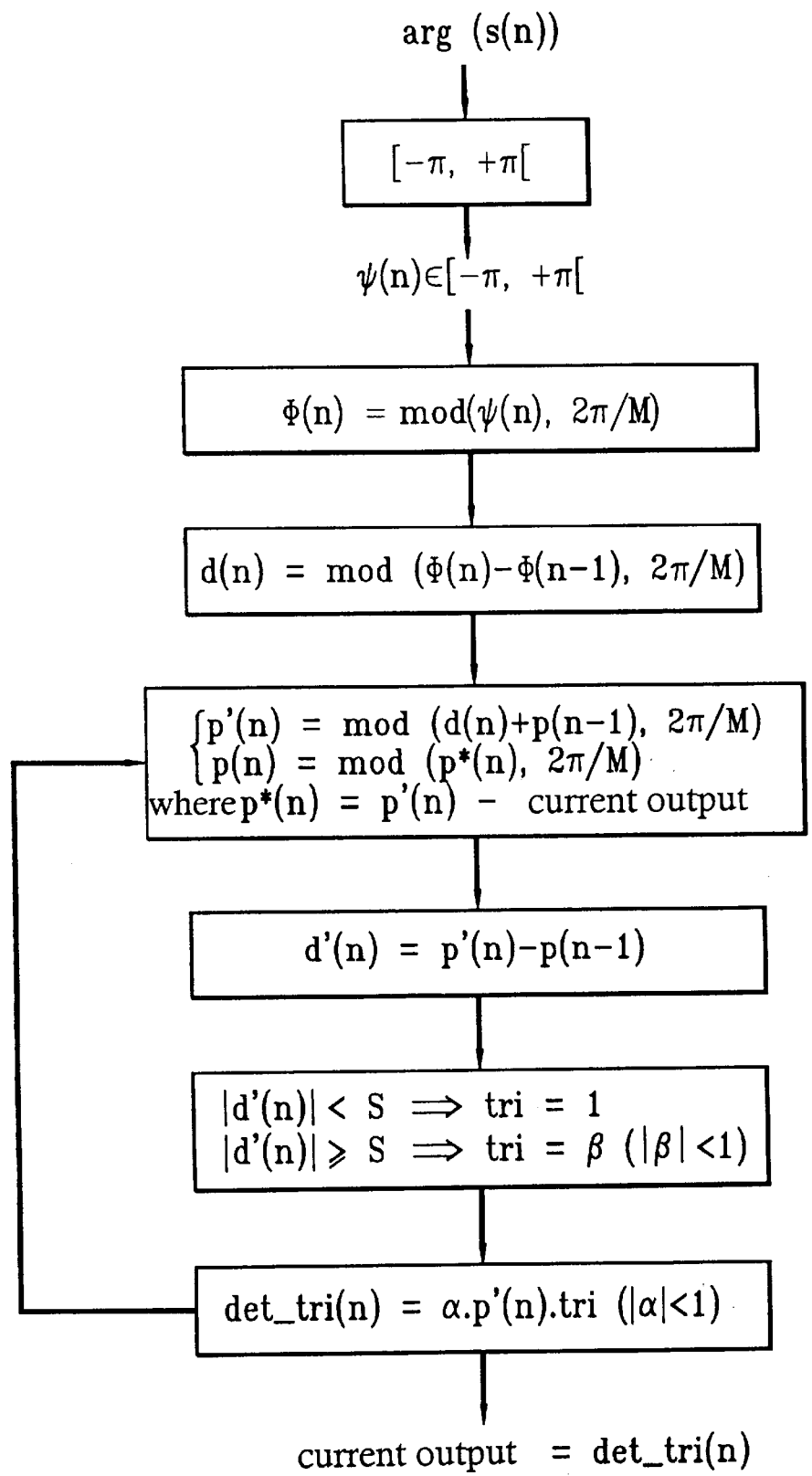
FIG. 1 is a flowchart of the method of the present invention.

The successive steps in the method according to the invention are described below. They correspond to the successive items in the flowchart in FIG. 1.

A first step consists in reducing to the interval [−π,+π[ the definition domain of the original phases of the samples s(n), which are denoted arg(s(n)) where n denotes the rank of the sample. $\psi$(n) denotes the phase of a sample after reduction of its definition domain to the interval [−π, +π[.

$\psi$(n) contains information on the carrier frequency error and on the modulation.

A second step consists in eliminating the modulation. To do this, $2\pi/M$ is subtracted from or added to $\psi$(n) until the value obtained, which is denoted $\phi$(n), lies on the interval [−π/M,+π/M[. This operation is denoted $\phi$(n)=mod($\psi$(n), $2\pi/M$). In a particular embodiment where M=$2^k$, k being a positive integer, this step consists in removing the k most significant bits of $\psi$(n).

Figure 2:
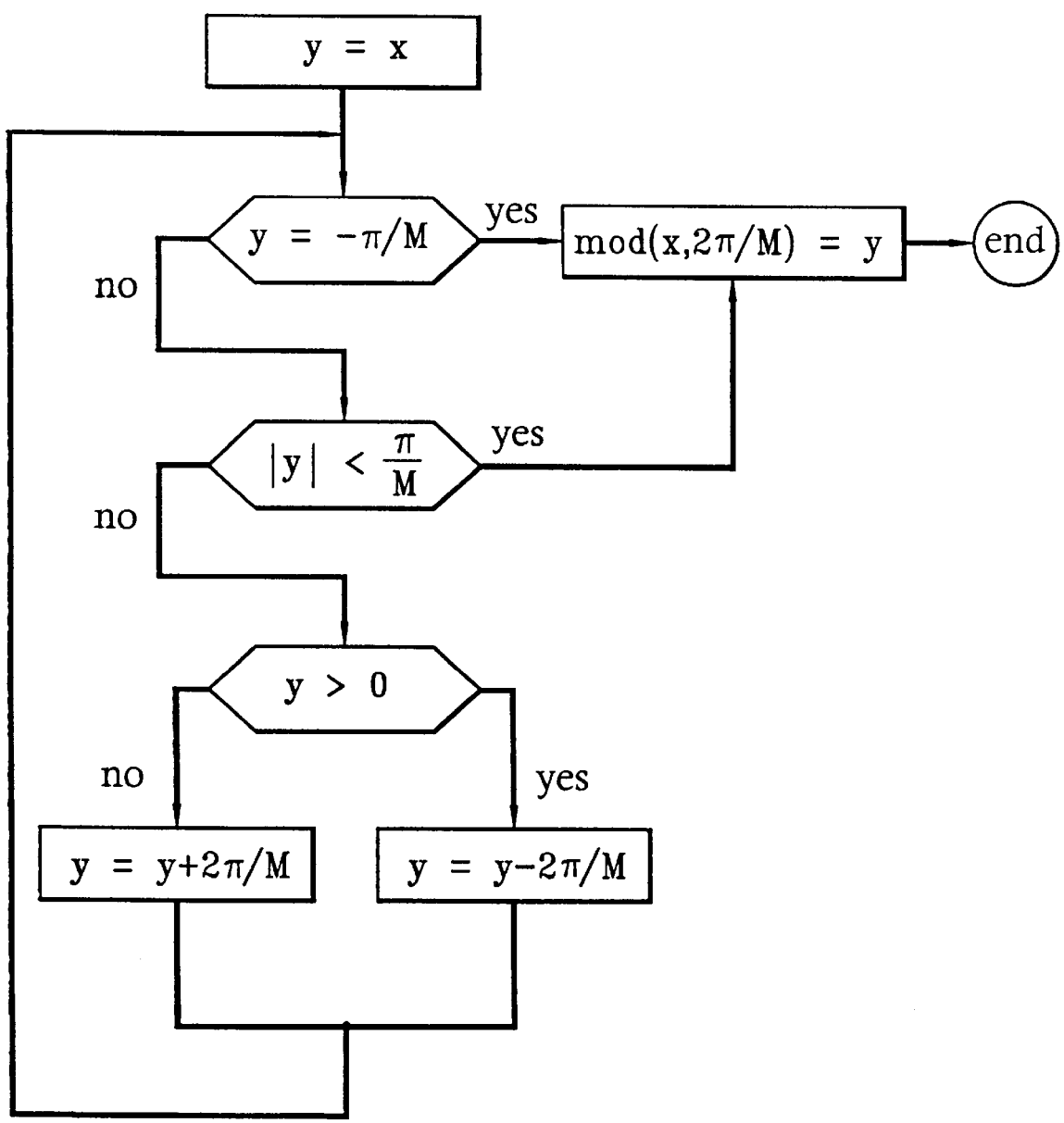
FIG. 2 is a flowchart defining a function, referred to as "modulo $2\pi/M$" which is used on several occasions during the method of the present invention.

In general, the function referred to as "modulo $2\pi/M$", which will be used again in what follows and which, receiving a variable x as input, delivers as output a variable denoted y=mod(x,$2\pi/M$), is defined by the flowchart in FIG. 2.

As shown by FIG. 2, a test is first made as to whether the value delivered as input to the modulo $2\pi/M$ function is equal to −π/M. If this is the case, mod(x,$2\pi/M$) =−π/M, and the calculation is finished.

If not, a test is made as to whether the value delivered as input to the modulo $2\pi/M$ function is strictly less, in absolute value, than π/M. If this is the case, the value delivered as output is equal to the value delivered as input.

If not, a test is made as to whether the value delivered as input is strictly positive. If this is the case, $2\pi/M$ is subtracted from it; if this is not the case, $2\pi/M$ is added to it; the algorithm is then repeated with the value obtained after this subtraction or addition of $2\pi/M$. In summary, the modulo $2\pi/M$ function can be described as follows: "$2\pi/M$ is subtracted or added until the value obtained lies on the interval [−π/M,+π/M [".

During a third step in the method according to the invention (see FIG. 1), a series d(n)=mod($\phi$(n)−$\phi$(n−1) is calculated, where $\phi$(n) is the series obtained previously. d(n) is therefore the difference $\phi$(n)−$\phi$(n−1), restored to the interval [−π/M,+π/M [ using the modulo $2\pi/M$ function. This difference is equal on average to $2\pi.\Delta f.T$, where $\Delta f$ denotes the carrier frequency error and T the symbol rate.

During a fourth step, two series p'(n) and p(n) are determined in conjunction, such that p'(n)=mod(d(n)+p(n−1), $2\pi/M$) $2\pi/M$) and p(n)=mod(p*(n),$2\pi/M$), where p*(n) is obtained by subtracting the current output from p'(n).

During a fifth step, a series d'(n)=p'(n)−p(n−1) is calculated.

During a sixth step, a parameter referred to as "tri" is introduced. Depending on the result of the comparison of the absolute value of d'(n) with a predetermined threshold S, the parameter "tri" takes either the value 1, or a value $\beta$, where $\beta$ is a real less than 1 in absolute value: if |d'(n)|<S then tri=1, and if |d'(n)|≧S then tri=$\beta$. S=π/M will advantageously be chosen.

During a seventh step, a series det_tri(n)=$\alpha$.p'(n). tri is calculated, where $\alpha$ is a real less than 1 in absolute value. The series of values det⁻tri(n) constitutes the current output, representing the carrier frequency error.

The steps listed above may be carried out both using software and using hard wiring, and may be incorporated in an application-specific integrated circuit (ASIC). They can then no longer be dissociated.

The device for carrier-frequency error detection proposed by the present invention will now be described in particular embodiments.

Figure 3:
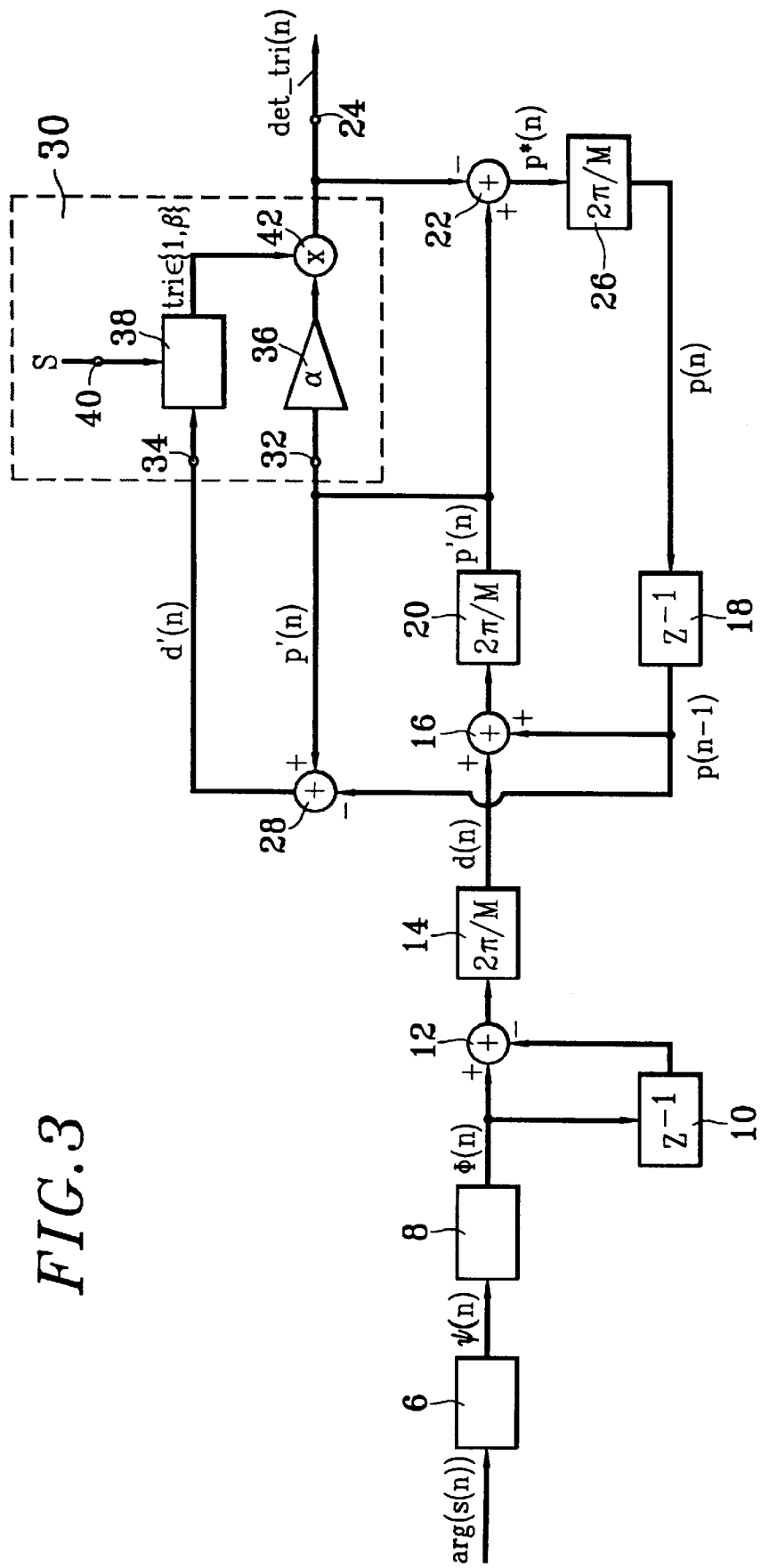
FIG. 3 is a symbolic diagram of the device of the present invention, in a particular embodiment.

In a first embodiment, illustrated by FIG. 3, the device comprises a module 6 for restoring the phase of the samples to the interval [−π,+π[. The module 6 receives as input a series arg(s(n)) formed by the original phases of the samples s(n) and delivers as output a series $\psi$(n) of phases restored to the interval [−π,+π[.

The output 104 (n) of the module 6 is connected to the input of a module 8 for eliminating the modulation. The module 8 delivers as output a series $\phi$(n)=mod($\psi$(n),$2\pi/M$), where mod(.,$2\pi/M$) is the function described further above.

The device also comprises a first delay element 10 which is connected to the output of the module 8 for eliminating the modulation, and a first subtractor element 12 having a first input connected to the output of the module 8 and a second input connected to the output of the delay element 10. The subtractor element 12 delivers as output the series $\phi(n)-\phi(n-1)$. The output of the subtractor element 12 is connected to the input of a first module 14 for calculating the mod(., $2\pi/M$) function. The module 14 delivers as output the series mod($\phi(n)-\phi(n-1),2\pi/M$), denoted d(n).

The device furthermore comprises an adder element 16, having a first input connected to the output of the module 14 and a second input connected to the output of a second delay element 18. The output of the adder element 16 is connected to the input of a second module 20 for calculating the mod(.,$2\pi/M$) function. The module 20 delivers as output a series p'(n). The device also comprises a second subtractor element 22, having a first input connected to the output of the module 20 and a second input connected to the current output 24 of the device. The subtractor element 22 delivers as output the series "p'(n)—current output", denoted p*(n). The output of the subtractor element 22 is connected to the input of a third module 26 for calculating the mod(.,$2\pi/M$) function. The module 26 delivers as output the series mod (p*(n),$2\pi/M$), denoted p(n). The output of the module 26 is connected to the input of the delay element 18.

In a particular embodiment, the assembly comprising the subtractor element 12 and the module 14, the assembly comprising the subtractor element 22 and the module 26, and the assembly comprising the adder element 16 and the module 20, may be produced in the form of an optionally common base 2 complement addition module without carry bit, when use is made of a prior sign-changing module for the two assemblies which include a subtractor element.

The delay element 18 delivers as output the series p(n−1). The device also comprises a third subtractor element 28, having a first input connected to the output of the module 20 and a second input connected to the output of the delay element 18. The subtractor element 28 delivers as output the series p'(n)−p(n−1), denoted d'(n).

Lastly, the device comprises a calculation module 30 having a first input 32 connected to the output of the module 20 and a second input 34 connected to the output of the subtractor element 28. The output of the calculation module 30 is the current output 24 of the device.

In the particular embodiment illustrated by FIG. 3, the calculation module 30 comprises a module 36 for amplification by a factor $\alpha$, a being a real less than 1 in absolute value. The input of the module 36 is connected to the input 32 of the calculation module 30. The module 36 receives as input the series p'(n) and delivers as output the series $\alpha.p'(n)$.

The calculation module 30 also comprises a comparison and calculation module 38, having an input connected to the input 34 of the calculation module 30, and having a control input 40. The module 38 receives on the input 34 the series d'(n) and receives on the control input 40 a predetermined threshold value S. The module 38 includes a module for calculating |d'(n)| and for comparing its value with the threshold S. The module 38 delivers as output a parameter tri whose value depends on the result of this comparison: if |d'(n)|<S, then tri=1, and if |d'(n)|$\geq$S, then tri=$\beta$, where $\beta$ is a real less than 1 in absolute value.

The calculation module 30 furthermore comprises a multiplier element 42 having a first input connected to the output of the module 36 and a second input connected to the output of the module 38. The output of the multiplier element 42 is connected to the output of the calculation module 30. The multiplier element 42 delivers as output the product $\alpha.p'(n)$.tri, denoted det⁻tri(n) and constituting the current output of the device. For the sake of clarity, the calculation module 30 has been described and represented in the form of three discrete parts (modules 36, 38 and element 42). This division into three parts is arbitrary, and the calculation module 30 may include either more than three separate entities, or alternatively indissociable elements.

Figure 4:
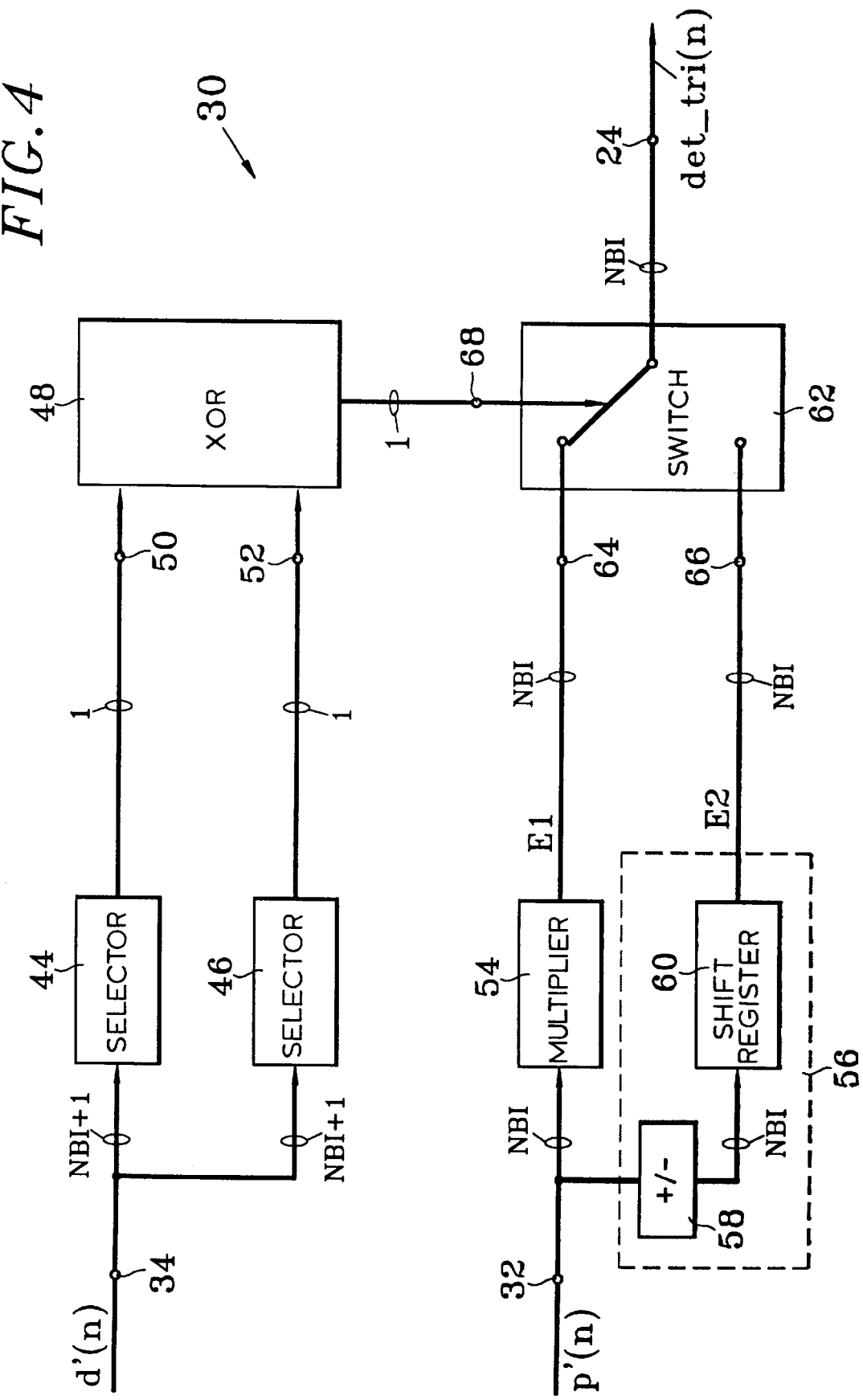
FIG. 4 is a diagram of a part of the device in FIG. 3, in an illustrative embodiment where S=$\pi/M$.

FIG. 4 represents a non-limiting illustrative embodiment of the calculation module 30 for S=$\pi/M$, S being the threshold defined further above. Let NBI denote the number of bits over which the values of the series p'(n), which are delivered to the input 32 of the module 30, are quantized. In the non-limiting example in FIG. 4, the values of the series d'(n) which are delivered to the input 34 of the module 30 are quantized over NBI+1 bits. A module 44 for selecting the most significant bit (MSB) is connected to the input 34. The module 44 receives as input the values of the series d'(n) and delivers as output the MSB of d'(n).

A module 46 for selecting the bit of significance immediately less than the MSB is also connected to the input 34. The module 46 receives as input the values of the series d'(n) and delivers as output the bit of d'(n) of significance immediately less than the MSB.

The calculation module 30 illustrated by FIG. 4 also comprises an exclusive OR operator 48 having an input 50 connected to the output of the module 44 and an input 52 connected to the output of the module 46. The exclusive OR operator 48 receives as input the MSB of d'(n) and the bit of d'(n) of significance immediately less than the MSB, and delivers as output the result of the exclusive OR operation on these two input bits. The inequality |d'(n)|<$\pi/M$ entails equality of the two aforementioned bits of d'(n). The output of the exclusive OR operator is then a logic "0". Similarly, if |d'(n)|$\geq\pi/M$, then the output of the exclusive OR operator is a logic "1".

A module 54 for multiplication by a is connected to the input 32 of the calculation module 30. The module 54 receives as input the values of the series p'(n) and delivers as output a value E1=p'(n).$\alpha$, quantized over NBI bits. The module 54 generally comprises a shift register for shifting to the right by $\alpha_1$, bits, where $\alpha_1=-\log_2\alpha$.

A module 56 for multiplication by $\alpha.\beta$ is also connected to the input 32 of the calculation module 30. In the particular embodiment in FIG. 4, the module 56 firstly comprises a module 58 for changing sign, which is connected to the input 32 and delivers as output the series −p'(n), quantized over NBI bits. The module 56 also comprises a module 60, connected to the output of the module 58. The module 60 generally comprises a shift register for shifting to the right by $\alpha_2$bits, where $\alpha_2=\log_2(-.\beta)$. The module 56 delivers as output a value E2=p'(n).$\alpha$. $\beta$, quantized over NBI bits.

Lastly, the calculation module 30 comprises a switching module 62 having a first input 64 connected to the output of the module 54, a second input 66 connected to the output of the module 56 and a control input 68 connected to the output of the exclusive OR operator 48. The module 62 receives on its input 64 the value E1, on its input 66 the value E2, and on its control input the output bit of the exclusive OR operator 48. Depending on the value of this bit, the module 62 switches to its input E1 or its input E2. In FIG. 4, the module 62 has been represented arbitrarily in the position switched to the input E1.

The module 62 may be produced in the form of a demultiplexer controlled by the output of the exclusive OR operator 48.

The switching module 62 delivers as output the value Ei=$\alpha.p'(n)$.tri, with tri=1 for i=1 and tri=$\beta$ for i=2. This value, denoted det⁻tri(n), constitutes the current output 24 of the device.

What we claim is:

1. A method of detecting the error on the frequency of an M-PSK phase-modulated carrier, M being the number of phase states of the modulation, comprising the steps of recovering a clock sampling and digitizing the in-phase and quadrature coordinates of the samples, and comprising the additional steps of:

(a) restoring the phase $\psi(n)$ of the samples, where n denotes the rank of the samples, to the interval, $[-\pi, +\pi[$, the phase $\psi(n)$ containing information on the carrier frequency error and on the modulation;

(b) in order to eliminate the modulation, calculating a series $\phi(n)=\mathrm{mod}(\psi(n), 2\pi/M)$, where $\mathrm{mod}(x, 2\pi/M)$ is obtained from the phase x by subtracting from the phase x, or adding to the phase x, a value $2\pi/M$ until the value obtained lies on the interval;

(c) calculating a series
$d(n)=\mathrm{mod}(\phi(n)-\phi(n-1), 2\pi/M)$, d(n) being equal in average to $2\pi.\Delta f.T$, where $\Delta f$ denotes the carrier frequency error and T denotes the symbol rate;

(d) calculating a series
$p'(n)=\mathrm{mod}(d(n)+p(n-1), 2\pi/M)$, where $p(n)=\mathrm{mod}(p^*(n), 2\pi/M)$, where $p^*(n)$ is a series obtained by subtracting the current output from p'(n);

(e) calculating a series
$d'(n)=p'(n)-p(n-1)$;

(f) determining a reliability parameter, referred to as "tri", which is defined by tri=1 if $|d'(n)|<S$ tri=$\beta$ if $|d'(n)|\geq S$ where $\beta$ f is a real whose absolute value is less than 1, where S is a predetermined threshold and where $|.|$ denotes the absolute value;

(g) calculating a series $\det\_\mathrm{tri}(n)=\alpha.p'(n).\mathrm{tri}$ where $\alpha$ is a real whose absolute value is less than 1, the series of values det_tri(n) constituting the current output, representative of the error on the frequency of the carrier.

2. A method according to claim 1, wherein the threshold S is equal to $\pi/M$.

3. A method according to claim 1, in which $M=2^k$ where k is a positive integer, wherein step (b) consists in removing the k most significant bits of $\psi(n)$.

4. A method according to claim 1, wherein $\alpha$ is a positive, $\beta$ is negative and the absolute values of the reals $\alpha$ and $\beta$ are powers of 2.

5. A device for detecting the error on the frequency of an M-PSK phase-modulated carrier, M being the number of states of the modulation, implementing the method according to claim 1, wherein the series det_tri(n) is calculated by means which comprise computation means which receive, on a first input, the values of the series p'(n), which are quantized over a predetermined number NBI of bits, and, on a second input, the values of the series d'(n), which are quantized over a number of NBI+1 of bits, and deliver as output the values of the series det_tri(n), and have:

means for selecting the most significant bit (MSB), which means are connected to said second input and deliver as output the MSB of d'(n);

means for selecting the bit of significance immediately less than the MSB, which means are connected to said second input and deliver as output the bit of d'(n) of significance immediately less than the MSB of d'(n);

an exclusive OR operator which receives, on one input, the MSB of d'(n), and on another input, the bit of d'(n) of significance immediately less than the MSB of d'(n), and performs an exclusive OR operation on these two input bits;

means for multiplication by $\alpha$, which comprise means for shifting to the right by $\alpha_1$ bits, where $\alpha_1=-\log_2\alpha$, are connected to the first input and deliver as output the product (E1) of p'(n) by $\alpha$;

means for multiplication by $\alpha.\beta$, which comprise
means for changing sign, which are connected to said first input, and deliver as output the product of p'(n) by $-1$, and
means for shifting to the right by $\alpha_2$ bits, where $\alpha_2=-\log_2(-\alpha.\beta)$, which are connected to the output of the means for changing sign and deliver as output the product of $-p'(n)$ by $(-\alpha.\beta)$,
the means for multiplication by $\alpha.\beta$ delivering as output the product (E2) of p'(n) by $\alpha.\beta$; and switching means which have a first input, a second input and a control input, receive the product (E1) on the first input, receive the product (E2) on the second input, and receive the value of the output bit of the exclusive OR operator on the control input, these switching means delivering as output the values of the series det_tri(n), which are equal either to (E1) or to (E2), depending on the value of the output bit of the exclusive OR operator.

* * * * *